US008790847B2

(12) United States Patent
Larsen et al.

(10) Patent No.: US 8,790,847 B2
(45) Date of Patent: Jul. 29, 2014

(54) METHOD FOR THE MANUFACTURE OF REVERSIBLE SOLID OXIDE CELLS

(75) Inventors: Peter Halvor Larsen, Roskilde (DK); Karen Brodersen, Kirke Hyllinge (DK)

(73) Assignee: Technical University of Denmark, Kgs. Lyngby (DK)

( * ) Notice: Subject to any disclaimer, the term of this patent is extended or adjusted under 35 U.S.C. 154(b) by 847 days.

(21) Appl. No.: 11/944,133

(22) Filed: Nov. 21, 2007

(65) Prior Publication Data

US 2008/0124602 A1    May 29, 2008

(30) Foreign Application Priority Data

Nov. 23, 2006  (EP) .................................... 06024339

(51) Int. Cl.
*H01M 8/12*   (2006.01)

(52) U.S. Cl.
CPC .......... *H01M 8/1253* (2013.01); *H01M 8/1246* (2013.01); *H01M 8/124* (2013.01)
USPC ............ 429/535; 429/496; 429/495; 429/491

(58) Field of Classification Search
USPC .......................................... 429/507, 523, 535
See application file for complete search history.

(56) References Cited

U.S. PATENT DOCUMENTS

| | | | |
|---|---|---|---|
| 3,023,492 A | 3/1962 | Bristow | |
| 4,209,147 A | 6/1980 | Jones, Jr. | |
| 4,702,971 A | 10/1987 | Isenberg | |
| 4,957,673 A | 9/1990 | Schroeder et al. | |
| 5,021,304 A | 6/1991 | Ruka et al. | |
| 5,058,799 A | 10/1991 | Zsamboky | |
| 5,064,734 A | 11/1991 | Nazmy et al. | |
| 5,162,167 A | 11/1992 | Minh et al. | |
| 5,358,735 A | 10/1994 | Kawasaki et al. | |
| 5,368,951 A | 11/1994 | Shiratori et al. | |
| 5,670,270 A | 9/1997 | Wallin et al. | |
| 5,702,837 A | 12/1997 | Xue | |

(Continued)

FOREIGN PATENT DOCUMENTS

| | | |
|---|---|---|
| CA | 2440288 | 3/2004 |
| CA | 2596173 | 8/2006 |

(Continued)

OTHER PUBLICATIONS

United States Patent Office Action for U.S. Appl. No. 11/813,074 dated Jan. 10, 2011 (13 pages).

(Continued)

*Primary Examiner* — Ula C Ruddock
*Assistant Examiner* — Scott J Chmielecki
(74) *Attorney, Agent, or Firm* — Michael Best & Friedrich LLP (57) ABSTRACT

A method of producing a reversible solid oxide cell. The method includes the steps of tape casting an anode support layer on a support (1); tape casting an anode layer on a support (2); tape casting an electrolyte layer on a support (3); and either laminating said anode layer on top of said anode support layer; removing said support (2) from said anode layer; laminating said electrolyte layer on top of said anode layer; and sintering the multilayer structure; or laminating said anode layer on top of said electrolyte layer; removing said support (2) from said anode layer; laminating said anode support layer on top of said anode layer; and sintering the multilayer structure.

15 Claims, 3 Drawing Sheets

(56) References Cited

U.S. PATENT DOCUMENTS

| | | | |
|---|---|---|---|
| 5,788,788 A * | 8/1998 | Minh | 156/62.2 |
| 5,803,934 A | 9/1998 | Carter | |
| 5,846,664 A | 12/1998 | Third et al. | |
| 5,908,713 A | 6/1999 | Ruka et al. | |
| 6,017,647 A | 1/2000 | Wallin | |
| 6,048,636 A | 4/2000 | Naoumidis et al. | |
| 6,099,985 A | 8/2000 | Elangovan et al. | |
| 6,191,510 B1 * | 2/2001 | Landin et al. | 310/51 |
| 6,232,009 B1 | 5/2001 | Batawi | |
| 6,248,468 B1 | 6/2001 | Ruka et al. | |
| 6,280,868 B1 | 8/2001 | Badwal et al. | |
| 6,458,170 B1 | 10/2002 | Visco et al. | |
| 6,479,183 B2 | 11/2002 | Tsukuda et al. | |
| 6,592,787 B2 | 7/2003 | Pickrell et al. | |
| 6,605,316 B1 | 8/2003 | Visco et al. | |
| 6,682,842 B1 | 1/2004 | Visco et al. | |
| 6,783,880 B2 | 8/2004 | Christiansen | |
| 6,811,913 B2 | 11/2004 | Ruhl | |
| 6,824,907 B2 | 11/2004 | Sarkar et al. | |
| 6,843,960 B2 | 1/2005 | Krumpelt et al. | |
| 6,844,099 B1 | 1/2005 | Gorte et al. | |
| 6,878,651 B2 | 4/2005 | Crosbie | |
| 6,936,217 B2 | 8/2005 | Quadadakkers et al. | |
| 6,958,196 B2 | 10/2005 | Gorte et al. | |
| 7,351,488 B2 | 4/2008 | Visco et al. | |
| 7,397,142 B1 | 7/2008 | Cooper | |
| 7,829,213 B2 | 11/2010 | Jacobson et al. | |
| 2001/0029231 A1 | 10/2001 | Gorte et al. | |
| 2002/0045090 A1 * | 4/2002 | Oyanagi et al. | 429/46 |
| 2002/0048699 A1 | 4/2002 | Steele et al. | |
| 2002/0122967 A1 | 9/2002 | Gorina et al. | |
| 2002/0127455 A1 | 9/2002 | Pham et al. | |
| 2002/0182468 A1 | 12/2002 | Janousek et al. | |
| 2003/0015431 A1 | 1/2003 | Barker et al. | |
| 2003/0035989 A1 | 2/2003 | Gorte et al. | |
| 2003/0040420 A1 | 2/2003 | Larsen et al. | |
| 2003/0059335 A1 | 3/2003 | Quadadakkers et al. | |
| 2003/0059668 A1 | 3/2003 | Visco et al. | |
| 2003/0082434 A1 | 5/2003 | Wang et al. | |
| 2003/0134169 A1 | 7/2003 | Sarkar et al. | |
| 2003/0134171 A1 | 7/2003 | Sarkar et al. | |
| 2003/0145525 A1 | 8/2003 | Rosenflanz | |
| 2003/0165726 A1 | 9/2003 | Robert et al. | |
| 2003/0178307 A1 | 9/2003 | Sarkar | |
| 2003/0186101 A1 | 10/2003 | Christansen et al. | |
| 2003/0224233 A1 * | 12/2003 | Kohler et al. | 429/30 |
| 2003/0224234 A1 | 12/2003 | Steele et al. | |
| 2003/0231973 A1 | 12/2003 | Krumpelt et al. | |
| 2003/0232230 A1 | 12/2003 | Carter et al. | |
| 2003/0235752 A1 | 12/2003 | England et al. | |
| 2004/0033405 A1 | 2/2004 | Barnett et al. | |
| 2004/0043269 A1 | 3/2004 | Taniguchi et al. | |
| 2004/0053101 A1 | 3/2004 | Chartier et al. | |
| 2004/0060967 A1 | 4/2004 | Yang et al. | |
| 2004/0115503 A1 | 6/2004 | Jacobson et al. | |
| 2004/0150366 A1 | 8/2004 | Ferrall et al. | |
| 2004/0169064 A1 | 9/2004 | Rinne et al. | |
| 2004/0173666 A1 | 9/2004 | Fukunaga et al. | |
| 2004/0183055 A1 | 9/2004 | Chartier et al. | |
| 2004/0209147 A1 | 10/2004 | Finkenwirth et al. | |
| 2005/0064220 A1 * | 3/2005 | Hasz | 428/546 |
| 2005/0089739 A1 | 4/2005 | Seccombe et al. | |
| 2005/0181253 A1 | 8/2005 | Finnerty et al. | |
| 2005/0244693 A1 | 11/2005 | Strutt et al. | |
| 2006/0024547 A1 | 2/2006 | Waldbillig et al. | |
| 2006/0121334 A1 | 6/2006 | Finkenwirth et al. | |
| 2006/0127725 A9 | 6/2006 | Sarkar et al. | |
| 2006/0147782 A1 | 7/2006 | Reisdorf et al. | |
| 2006/0234100 A1 | 10/2006 | Day et al. | |
| 2006/0257703 A1 | 11/2006 | Qi et al. | |
| 2006/0269812 A1 | 11/2006 | Lemkey | |
| 2006/0280998 A1 | 12/2006 | Ying et al. | |
| 2007/0009784 A1 | 1/2007 | Pal et al. | |
| 2007/0040003 A1 | 2/2007 | Rinne et al. | |
| 2007/0172719 A1 * | 7/2007 | Meinhardt et al. | 429/44 |
| 2007/0269701 A1 | 11/2007 | Larsen et al. | |
| 2008/0096079 A1 | 4/2008 | Linderoth et al. | |
| 2008/0118635 A1 | 5/2008 | Larsen | |
| 2008/0142148 A1 | 6/2008 | Nielsen et al. | |
| 2008/0166618 A1 | 7/2008 | Larsen et al. | |
| 2009/0148743 A1 | 6/2009 | Day et al. | |
| 2013/0025292 A1 | 1/2013 | Larsen et al. | |

FOREIGN PATENT DOCUMENTS

| | | |
|---|---|---|
| CA | 2537375 | 9/2006 |
| CN | 1409427 | 4/2003 |
| CN | 1997229 | 7/2007 |
| DE | 4237602 | 5/1994 |
| DE | 19650704 | 6/1998 |
| DE | 19710345 | 1/1999 |
| DE | 19836132 | 2/2000 |
| EP | 0446680 | 9/1991 |
| EP | 1065020 | 1/2001 |
| EP | 1255318 | 11/2002 |
| EP | 1306920 | 5/2003 |
| EP | 1318560 | 6/2003 |
| EP | 1383195 | 1/2004 |
| EP | 1699104 | 9/2006 |
| GB | 1313795 | 4/1973 |
| GB | 2400723 | 10/2004 |
| JP | 02-019406 | 1/1990 |
| JP | 08-222249 | 8/1996 |
| JP | 09-050812 | 2/1997 |
| JP | 9-274921 | 10/1997 |
| JP | 2001335388 | 12/2001 |
| JP | 2002-329508 | 11/2002 |
| JP | 2003-522384 | 7/2003 |
| JP | 2003-528979 | 9/2003 |
| JP | 2003-282068 | 10/2003 |
| JP | 2003-331856 | 11/2003 |
| JP | 2004-119108 | 4/2004 |
| JP | 2004152585 | 5/2004 |
| JP | 2004319286 | 11/2004 |
| JP | 2005-166483 | 6/2005 |
| JP | 2006-049248 | 2/2006 |
| JP | 2006-134611 | 5/2006 |
| JP | 2006-321706 | 11/2006 |
| WO | WO 92/15122 | 9/1992 |
| WO | WO 98/49738 | 11/1998 |
| WO | WO 99/56899 | 11/1999 |
| WO | 01/57945 | 8/2001 |
| WO | 01/72456 | 10/2001 |
| WO | WO 02/09116 | 1/2002 |
| WO | WO 02/45198 | 6/2002 |
| WO | WO 02/073729 | 9/2002 |
| WO | 03/036739 A2 | 5/2003 |
| WO | WO 03/069705 | 8/2003 |
| WO | WO 03/075382 | 9/2003 |
| WO | WO 03/105252 | 12/2003 |
| WO | WO 2004/001885 | 12/2003 |
| WO | WO 2004/013925 | 2/2004 |
| WO | WO 2004/030130 | 4/2004 |
| WO | WO 2004/030133 | 4/2004 |
| WO | WO 2004/079033 | 9/2004 |
| WO | WO 2005/122300 | 12/2005 |
| WO | WO 2006/069753 | 7/2006 |
| WO | WO 2006/074932 | 7/2006 |
| WO | 2006/082057 A2 | 8/2006 |
| WO | WO 2006/079558 | 8/2006 |
| WO | WO 2007/025762 | 3/2007 |

OTHER PUBLICATIONS

United States Patent Office Action for U.S. Appl. No. 11/815,025 dated Jan. 26, 2011 (5 pages).

United States Patent Office Notice of Allowance for U.S. Appl. No. 11/813,074 dated Apr. 15, 2011 (2 pages).

United States Patent Office Action for U.S. Appl. No. 11/813,074 dated May 19, 2010 (11 pages).

United States Patent Office Action for U.S. Appl. No. 11/815,025 dated May 26, 2010 (7 pages).

(56) References Cited

OTHER PUBLICATIONS

International Search Report and Written Opinion from International Searching Authority for PCT/EP2005/013968 dated Mar. 28, 2006 (10 pages).
International Preliminary Report on Patentability from International Searching Authority for PCT/EP2005/013968 dated Mar. 30, 2007 (10 pages).
International Search Report and Written Opinion from International Searching Authority for PCT/EP2006/000229 dated Mar. 15, 2006 (9 pages).
International Search Report and Written Opinion from International Searching Authority for PCT/EP2006/000920 dated Sep. 22, 2006 (10 pages).
International Search Report and Written Opinion from International Searching Authority for PCT/EP2006/000813 dated Mar. 29, 2006 (10 pages).
International Preliminary Report on Patentability from International Searching Authority for PCT/EP2006/000813 dated May 18, 2007 (10 pages).
International Search Report and Written Opinion from International Searching Authority for PCT/DK2005/000379 dated Dec. 16, 2005 (14 pages).
United States Office Action for U.S. Appl. No. 11/814,356 dated May 1, 2008 (7 pages).
International Search Report from International Searching Authority for PCT/EP2006/008537 dated Aug. 8, 2007 (3 pages).
United States Office Action for U.S. Appl. No. 11/570,320 dated May 26, 2009 (15 pages).
Notice of Allowability with Office Action for U.S. Appl. No. 11/814,356 dated Jul. 6, 2009.
United States Office Action for U.S. Appl. No. 11/814,356 dated Jan. 26, 2009 (7 pages).
Donald, I.W., "Preparation, properties and chemistry of glass and glass-ceramic-to-metal seals and coatings," J. Mat. Sci. (1993) 28:2841-2886.
Dyck, C.R. et al., "Synthesis and characterization of $Gd_{(1-x)}Sr_xCo_{(1-y)}Fe_yO_{(3-\delta)}$ as a cathode material for intermediate temperature solid oxide fuel cells," Mat. Res. Soc. Symp. Proc. (2004) 801:113-118.
Gut, B. et al., "Anode supported PEN for SOFC. Pressed substrates for spray pyrolysed and co-sintered electrolyte; redox stability and alternative anode," Jahresbericht (2001) 1-6.
Kim, J.H. et al., "Fabrication and characteristics of anode-supported flat-tube solid oxide fuel cell," J. Power Sources (2003) 122(2):138-143.

Klemensø, T. et al., "The mechanism behind redox instability of anodes in high-temperature SOFCs," Electrochemical Society Journal (2005) 152(11):A2186-A2192.
Matus, Y. et al., "Metal-supported solid oxide fuel cell membranes for rapid thermal cycling," Solid State Ionics (2005) 176:443-449.
Nadler, J.H. et al., "Oxide reduction and sintering of Fe—Cr alloy honeycombs," J. Mat. Research (2003) 18(8):1787-1794.
Xia, C. et al., "Functionally graded cathodes for honeycomb solid oxide fuel cells," Electrochem. Solid-State Letters (2002) 5(10):A217-A220.
Young, R.C. et al., "Symposium BB: Materials and Technologies for a Hydrogen Economy," Materials Research Society Symposium Proceedings Series (Nov. 30, 2003) pp. 709-717.
Zhang, Y. et al., "Redox cycling of Ni-YSZ anode investigated by TPR technique," Solid State Ionics (2005) 176:2193-2199.
European Search Report, European Application No. EP06024339, dated Feb. 2, 2007.
Han, M-F. et al., "Manufacturing processes of solid oxide fuel cell," China Academic Journal Electronic Publishing House (2001) 10:1195-1198.
United States Patent Office Action for U.S. Appl. No. 11/813,798 dated Jun. 28, 2011 (9 pages).
United States Patent Office Notice of Allowance for U.S. Appl. No. 11/813,798 dated Aug. 5, 2011 (4 pages).
United States Patent Office Action for U.S. Appl. No. 11/815,025 dated Aug. 11, 2011 (7 pages).
United States Patent Office Action for U.S. Appl. No. 12/065,357 dated Dec. 23, 2011 (9 pages).
United States Patent Office Final Rejection for U.S. Appl. No. 12/065,357 dated Aug. 2, 2012 (8 pages).
United States Patent Office Action for U.S. Appl. No. 12/065,357 dated Aug. 21, 2012 (9 pages).
Grosjean A et al.: "Reactivity and diffusion between La0.8Sr0.2MnO3 and ZrO2 at interfaces in SOFC cores by TEM analyses on FIB samples", Solid State Ionics, vol. 177, No. 19-25, Oct. 15, 2006, pp. 1977-1980.
United States Patent Office Action for U.S. Appl. No. 13/559,937 dated Dec. 13, 2012 (7 pages).
United States Patent Office Final Rejection for U.S. Appl. No. 12/065,357 dated Mar. 4, 2013 (8 pages).
United States Patent Office Action for U.S. Appl. No. 13/559,937 dated Jun. 14, 2013 (7 pages).
Japanese Patent Office Action for Application No. 2012-175050 Dated Jan. 21, 2014 (7 pages—including English Translation).

\* cited by examiner

Figure 3

METHOD FOR THE MANUFACTURE OF REVERSIBLE SOLID OXIDE CELLS

CROSS REFERENCE TO RELATED APPLICATIONS

This patent application claims priority to European Patent Application No. 06024339.1 filed 23 Nov. 2006, the disclosure of which is incorporated by reference herein in its entirety. Priority to European Patent Application No. 06024339.1 is hereby claimed.

TECHNICAL FIELD

The present invention relates to an improved cost effective method for the manufacture of reversible solid oxide cells, particularly solid oxide fuel cells.

BACKGROUND ART

Solid oxide cells (SOC's) include cells designed for different applications, such as solid oxide fuel cells (SOFC's), or solid oxide electrolysis cells (SOEC's). These types of cells are well known in the art. Typically, a solid oxide fuel cell comprises an electrolyte layer sandwiched by two electrode layers. During operation, usually at a temperature from about 500° C. to about 1100° C., one electrode is in contact with oxygen or air and the other electrode is in contact with a fuel gas. In the case of SOFC's the cathode is in contact with oxygen or air and the anode is in contact with the fuel gas.

The most common manufacture processes suggested in the prior art comprise the manufacture of single cells, which are then stacked together for more power output. Generally, a support is provided, on which an anode layer is formed, followed by an electrolyte layer. The so formed half cell is then dried and sintered, occasionally under reducing atmosphere conditions. Finally, a cathode layer is formed on the sintered structure so as to obtain a complete cell.

The cells are usually manufactured by the use of wet powder processing techniques which comprise tape-casting of the support component. The cell support component is normally made by tape casting of a powder suspension and the active layers (cathode, electrolyte and anode) are subsequently deposited onto the support by spray painting or screen printing, with intermediate sintering steps for the different layers.

Alternatively, SOFC's are for instance manufactured by electrochemical vapour deposition (CVD) methods or plasma spraying. However, said processes are very expensive, and thus there has been a desire to lower the fabrication costs.

U.S. Pat. No. 5,803,934 relates to a method of producing an electrode layer on a solid electrolyte of a solid state fuel cell. Manually cast foils were made from a slurry and formed into a chromate tape. The chromate tapes were then laminated with a green 8 mol % Yttria stabilized zirconia tape by painting the corresponding surfaces of the tapes with ethanol and passing the laminates through a roller mill. The laminates were placed between fibrous alumina plates to prevent curling and sintered in air at 1,300° C. for 6 hours.

U.S. Pat. No. 5,846,664 relates to a process for the manufacture of a porous metal component. A colloidal suspension is provided, cast into a thin sheet and air dried to form a tape having pre-selected pliability properties. A predetermined number of tape layers is stacked and compacted between rollers, or layered in a die, or otherwise pre-formed and laminated. Lamination takes places at pressures ranging from between about 5 MPa to about 60 MPa at temperatures in the range of between about 25° C. to about 80° C. for a time effective to laminate said layers of tape and form a green body.

U.S. 2003/0231973 relates to a method for preparing compositionally graded metallic plates and compositionally graded metallic plates suitable for use as interconnects for solid oxide fuel cells. More specifically, plates with graded composition, from one side to the other, may be prepared by forming layers of different slips on top of each other or laminating together separately prepared green layers, using a small amount of solvent between the layers or warm pressing together. One process includes the lamination of separately prepared green layers optionally having a small amount of solvent painted between the layers to promote bonding. The green layers may also be compressed together. Functionally graded or laminated materials may be prepared by wiping a solvent on one or both surfaces of each layer and stacking multiple layers in the desired order. Theses multi-layers are then warm pressed to help ensure good adhesion between the layers.

U.S. Pat. No. 5,788,788 relates to a method of preparing a fuel cell element including the step of: laminating ceramic tapes to form an unfired anode/electrolyte laminate; reducing the thickness of the anode/electrolyte laminate; sintering the anode/electrolyte laminate; laminating ceramic tapes to form an unfired cathode/interconnect laminate; reducing the thickness of the cathode/interconnect laminate; embossing a gas flow path pattern into the cathode layer of the cathode/interconnect laminate; sintering the cathode/interconnect laminate; and bonding the sintered anode/electrolyte laminate to the sintered cathode/interconnect laminate such that the electrolyte layer contacts the cathode layer. The fabrication further typically involves reducing the thickness of the laminates, for example by rolling. The stack is passed between two rolls to laminate the two layers together in order to form an unfired anode/electrolyte laminate or cathode/interconnect laminate.

EP-A-1306920 relates to a unit cell for a fuel cell which is formed by laminating a fuel electrode, a solid electrolyte, and an air electrode on a porous base material. The fuel electrode of the unit cell can be made as a laminated body by laminating a plurality of fuel electrode layers. As may be seen from the examples, a Copper-made porous metal was obtained, a Samarium doped ceria layer was formed as a fuel electrode material, a Samarium doped ceria layer was formed as a solid electrolyte material, and the thus obtained sheets were layered on top of each other. The laminated sheets were afterwards pressurized at 100 g/cm$^2$, whereby the adhesiveness among the various layers was enhanced.

WO-A2-03/036739 discloses solid oxide fuel cells made by coating a slurry of an electrolyte having a limited amount of organic material onto a carrier tape, depositing at least one layer electrode material on tape to support the electrolyte layer, removing the tape, screen printing a second electrode layer on the exposed surface of the electrolyte layer, and firing the layers at temperatures of 1100 to 1300° C.

U.S. Pat. No. 4,957,673 discloses a unitary layered ceramic structure which comprises co-sintered layers. The co-sintered structure comprises a sintered central layer of yttria stabilized zirconia, and sintered outer layers of strontium lanthanum manganite.

US-A-2006/0024547 relates to a fuel cell comprising a cathode, an electrolyte, an anode and a porous multifunctional layer disposed on the anode opposite to the electrolyte. The porous multifunctional layer comprises a cermet which has thermal expansion and shrinkage behaviour substantially similar to the other fuel cell layers.

WO-A-2006/082057 relates to a method of producing a reversible solid oxide fuel cell, comprising the steps of 1) providing a metallic support layer; 2) forming a cathode precursor layer on the metallic support layer; 3) forming an electrolyte layer on the cathode precursor layer; 4) sintering the obtained multilayer structure; 5) impregnating the cathode precursor layer so as to form a cathode layer; and 6) forming an anode layer on top of the electrolyte layer.

However, while the prior art focuses primarily on new suitable materials for use in solid oxide fuel cells, there still exists a need for an improved method of producing a solid oxide cell at a large scale, with which solid oxide cells can be produced very accurately at a high quality while minimizing waste material and waste product, thus being cost effective.

BRIEF DESCRIPTION OF THE INVENTION

In view of the disadvantages of the prior art as described above, the present invention provides a method of producing a reversible solid oxide cell, comprising the steps of:
  tape casting an anode support layer on a support (1);
  tape casting an anode layer on a support (2);
  tape casting an electrolyte layer on a support (3); and either
  laminating said anode layer on top of said anode support layer;
  removing said support (2) from said anode layer;
  laminating said electrolyte layer on top of said anode layer; and
  sintering the multilayer structure; or
  laminating said anode layer on top of said electrolyte layer;
  removing said support (2) from said anode layer;
  laminating said anode support layer on top of said anode layer; and
  sintering the multilayer structure.

The present invention further provides a method of producing a reversible solid oxide cell, comprising the steps of:
  tape casting an anode support layer on a support (1);
  tape casting an electrolyte layer on a support (3); and either
  tape casting an anode layer on top of said anode support layer;
  laminating said electrolyte layer on top of said anode layer;
  optionally removing support (1) and/or (3) from the anode support layer and/or the electrolyte layer; and
  sintering the multilayer structure; or
  tape casting an anode layer on top of said electrolyte layer;
  laminating said anode support layer on top of said anode layer;
  optionally removing support (1) and/or (3) from the anode support layer and/or the electrolyte layer; and
  sintering the multilayer structure.

The present invention also provides a method of producing a reversible solid oxide cell, comprising the steps of:
  tape casting an anode support layer on a support (1);
  tape casting an anode layer on top of the anode support layer;
  tape casting an electrolyte layer on top of the anode layer; and
  sintering the multilayer structure; or
  tape casting an electrolyte layer on a support (1);
  tape casting an anode layer on top of said electrolyte layer;
  tape casting an anode support layer on top of said anode layer; and
  sintering the multilayer structure.

The present invention furthermore provides a sintered multilayer structure, obtainable by the above methods. Said multilayer structure may be used for solid oxide fuel cells, solid oxide electrolysis cells, or separation membranes.

Preferred embodiments are set forth in the subclaims.

DETAILED DESCRIPTION OF THE INVENTION

First Embodiment

In the first embodiment, the method of producing a reversible solid oxide cell, comprising the steps of:
  tape casting an anode support layer on a support (1);
  tape casting an anode layer on a support (2);
  tape casting an electrolyte layer on a support (3); and either
  laminating said anode layer on top of said anode support layer;
  removing said support (2) from said anode layer;
  laminating said electrolyte layer on top of said anode layer; and
  sintering the multilayer structure; or
  laminating said anode layer on top of said electrolyte layer;
  removing said support (2) from said anode layer;
  laminating said anode support layer on top of said anode layer; and
  sintering the multilayer structure.

The obtained multilayer structure may be used in SOC applications, such as a solid oxide fuel cell, solid oxide electrolysis cell or separation membrane. Preferably, the obtained multilayer structure is 'reversible'. Reversible in the sense of the present invention relates to the common basic structure of the SOFC and SOEC. In an SOFC, fuel is fed into the cell and converted into power, while in an SOEC power is applied. The multi-layer structure obtained with the process of the present invention may preferably be suitable to be used in both, SOFCs and SOECs, and is therefore a reversible multilayer structure.

In the first step of the method the anode support layer is formed on a support (1) by tape-casting. Said support is a removable support, which may preferably be reused as a support for another layer after being removed. If necessary, the support may be cleaned prior to being reused, for example by means of a solvent. Polymeric films, paper and the like may be preferably used as support materials.

In the first embodiment, in separate steps, the anode layer and the electrolyte layer are formed by tape-casting on respective supports (2, 3). Suitable supports are preferably the same as the support used for the anode support layer described above.

Alternatively, in the first step of the method the electrolyte layer is formed on a support (3) by tape-casting. In separate steps, the anode support layer and the anode layer are formed by tape-casting on respective supports (1, 2).

After formation of the layers, the anode layer and anode support layer are laminated together. Lamination is carried out by bringing the layers in contact with each other, followed by directing the layers through at least one pair of rolls so as to bond them together.

Preferably, the lamination steps are carried out under elevated pressure. Preferably, a pressure of from about 1 to 5 bar is applied, with a pressure of from about 1 to 2 bar being more preferred. Due to the application of pressure, the at least one pair of rolls presses the layers together to improve the bonding of the layers.

It is further preferred that the thickness of the respective layers prior to and after the lamination step is basically the same, i.e. the application of pressure to the rolls improves the bonding of the layers to each other but does not result in a significant decrease of the overall thickness of the layers.

It is also preferred that no additional solvent is applied on the layers prior to lamination. The application of a solvent is in this case not essential for improving the bonding of the layers in the method of the present invention. Furthermore, the application of solvent requires an additional method step, making the method and apparatus consequently more complicated and time consuming, which adds to the overall costs.

Moreover, in case of organic volatile solvents, the working conditions in the vicinity of the apparatus and the environmental safety may become a concern. Since preferably no solvent is applied in the method of the present invention, said disadvantages are avoided while the method is more cost effective.

The lamination of the layers is preferably carried out under heating. Preferred temperatures are from about 30 to 200° C., with temperatures from about 40 to 170° C. being more preferred. Advantageously, due to elevated temperatures the bonding of the layers to each other is improved.

During the first lamination step, the anode layer and anode support layer are laminated to each other by bringing the layers directly in contact with each other such that the side of the layers facing each other is opposite to the side being in contact with the support, followed by directing them through at least one pair of rolls. Thus, the rolls of the at least one pair of rolls will only come in contact with the surfaces of the support while laminating the layers together.

As a result, the respective layers are well protected from impurities, such as dust, since they are covered by the removable support. They can also be stored in this condition without any impurities being deposited on the protected surfaces. Further, any impurities which might be located on the surface of the rolls themselves cannot be transferred onto the layers.

Another advantage is the possibility of conducting a quality control of each individual layer in the dry green state before lamination. Due to said quality control, the overall quality and percentage of usable final product can be improved. Further, any damaged or unusable parts can be removed form the process at this stage. Thus, the damaged parts are not subject to additional process steps, leading to less waste material being produced, resulting in the process being more cost efficient. By comparison, this quality control step is not possible when for instance spray painting or screen printing is used instead of tape casting as the deposition process of the layer.

Of course, the transfer of parts of the layer composition onto the rollers is also effectively prevented, in return reducing the need of frequent cleaning operations of the rolls or the replacement of the rolls. Consequently, the amount of impurities in the final product can be significantly toned down, and thus less malfunctional waste product is produced with the method of the present invention. Moreover, due to less cleaning of the rolls required, the apparatus can be run longer without the need of stopping and opening the apparatus during the production process.

After the lamination of the anode layer and anode support layer, support (2) is removed from the anode layer prior to the lamination of the electrolyte layer thereon. The separately formed electrolyte layer is laminated on top of the anode layer in the same way as described in detail above, i.e. such that only the respective support surfaces come in contact with the at least one pair of rolls, and then directing them through at least one pair of rolls. As described above, the removed support is preferably reused in the method of the present invention, thereby reducing the amount of waste material.

It is preferred that the lamination steps and removal of the support are carried out as one process step. After bringing the anode layer in contact with either the anode support layer or electrolyte layer, the support (2) is removed, followed by bringing the layer in contact with the respective third layer, i.e. the electrolyte layer or anode support layer. Directly after bringing the respective third layer in contact with the anode layer, the three layers are laminated altogether.

Due to the lamination of all three layers, the apparatus can be simplified and the number of method steps can be reduced, thus being more time and energy efficient.

In the next step, the obtained multi-layer structure, comprising the anode support layer, the anode layer and the electrolyte layer, is sintered. The sintering step is preferably carried out at a temperature of from about 900° C. to about 1500° C., preferably from about 1000° C. to about 1400° C.

It is also preferred that support (3) is removed from the electrolyte layer prior to the sintering step. Thereby, impurities on the support layer can be removed together with the support and thus not be accumulated in the final product. If the support is however maintained on the electrolyte layer after lamination, it will be incinerated during the sintering step and thereby removed.

It is furthermore preferred that support (1) is removed from the anode support layer prior to the sintering step. Thereby, any impurities can be removed together with the support and will not be accumulated in the final product. If the support is however maintained on the anode support layer after lamination, it will be incinerated during the sintering step and thereby removed.

Advantageously, in the method of the present invention, the separate tape-casting of the layers allows for a continuous formation of the respective layers which are then laminated together. Of course, the formation does not have to be continuous but can alternatively be done batch-wise. The tape-casting step produces less waste material as compared to other methods of layer formation used in the art, such as spray paining. Spray painting, for example, not only requires a separate apparatus, thereby adding to the costs, but also inevitably results in waste material being sprayed in areas adjacent to the formed layer, said material being lost and having to be deposed, again adding to the manufacturing costs.

Furthermore, with other manufacturing processes suggested in the prior art, any impurities on the layer surfaces, such as dust particles, are liable to create layer defects which result in the obtained multilayer structure immediately being unsuitable for the intended purpose, thus, being waste product, or in a short life time of the multilayer. For example, some areas of the layers may have an inhomogeneous layer thickness with elevations caused by the impurity particles, translating to uneven layer profiles of the layers on top thereof, and finally leading to uneven layer properties in the multilayer structure.

By contrast, with the lamination steps employed in the method of the present invention, the respective layers are tape-cast separately, thus forming a homogeneous surface, and then laminated on each other by directing them through at least a pair of rolls. Thereby, inhomogeneous surfaces of the laminate and layer defects are effectively avoided. Moreover, the thickness for each layer can be adjusted separately and thus very accurately, depending on the desired application, without the need of complicated lamination steps in which the thickness of each layer is reduced while being laminated to an adjacent layer already. Thus, a very precise control of the thickness of each layer is possible.

It is further preferred that the method comprises the additional step of tape-casting a cathode layer or cathode precursor layer on a support (4), and laminating said cathode layer on top of said electrolyte layer as outlined above. If the lamination is carried out prior to sintering the multilayer structure, support (3) is removed before bringing the electrolyte layer and the cathode layer in contact with each other.

In case of a cathode precursor layer, the method further comprises the impregnation of the cathode precursor layer with a catalyst or catalyst precursor material. The catalyst precursor material is then transformed into the catalyst in an additional step.

Optionally, the method also comprises the step of impregnating said electrolyte material(s) if desired.

Preferably, the method further comprises the steps of:
tape casting a cathode layer or cathode precursor layer on a support (4);
removing said support (3) from the electrolyte layer;
laminating said cathode layer on top of said electrolyte layer; and optionally removing said support (4) prior to sintering the multilayer structure.

More preferably, the method further comprises the steps of:
tape casting a barrier layer on a support (5);
tape casting a cathode layer or a cathode precursor layer on a support (4);
removing said support (3) from the electrolyte layer;
laminating said barrier layer on top of said electrolyte layer;
removing said support (5) from said barrier layer;
laminating said cathode layer on top of said barrier layer; and
optionally removing said support (4) prior to sintering the multilayer structure.

The barrier layer advantageously prevents interface reactions between the electrolyte and cathode.

The cathode may not only be applied by lamination as outlined above, but may also be applied by other methods, such as direct tape casting, spraying or screen printing.

The thickness of the anode support layer in the obtained multilayer structure after sintering is preferably in the range of from about 100 to 1000 µm. The thickness of the anode layer is preferably in the range of from about 5 to 50 µm. Furthermore, the thickness of the electrolyte layer is preferably in the range of from about 3 to 30 µm. The thickness of the barrier layer, if present, is preferably in the range of from about 0.1 to 5 µm. Finally, the thickness of the cathode layer is in the range of from about 5 to 50 µm.

Figure 1:
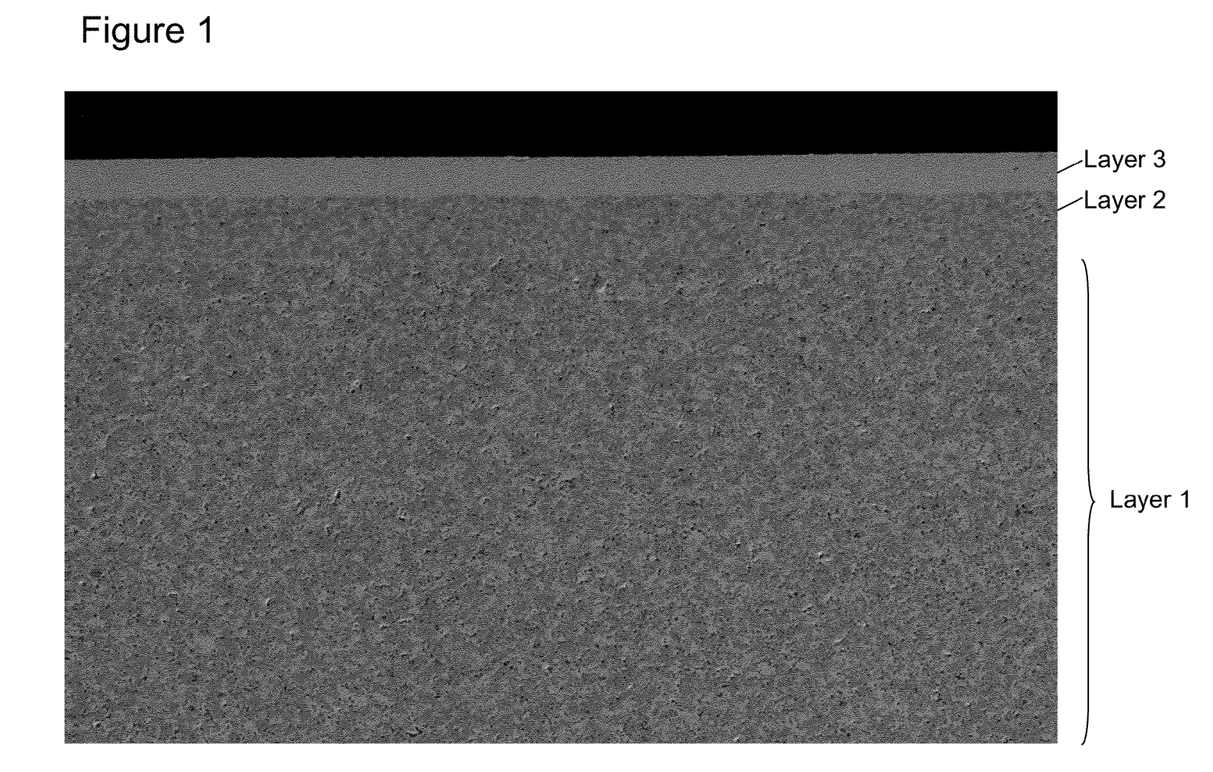
FIG. 1 illustrates a microstructure after sintering as obtained in Example 1.

In FIG. 1, a microstructure after sintering as obtained in Example 1 is shown. The top layer (layer 3) is the electrolyte layer, layer 2 is the anode layer, and layer 1 is the anode support layer.

Figure 3:
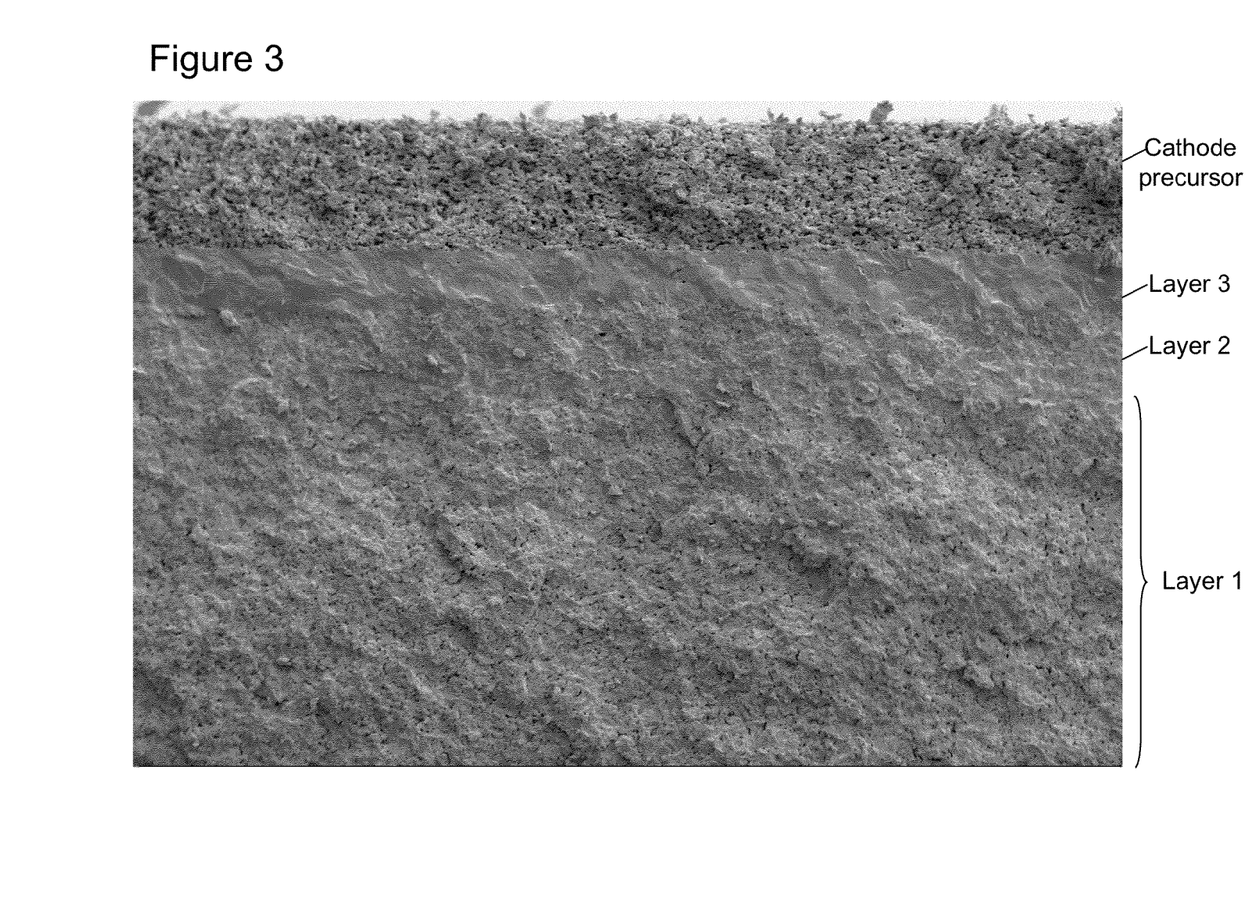
FIG. 3 illustrates a microstructure after sintering as obtained in Example 8.

In FIG. 3, a microstructure after sintering as obtained in Example 8 is shown, containing additionally a cathode precursor layer (layer 4) on top of the electrolyte layer.

It is also preferred that the anode support layer, anode layer, electrolyte layer, barrier layer and/or cathode layer are multilayer structures comprising at least two layers. Said multilayer structure may for example be a structure comprising at least two layers being formed from the same material but having a different porosity. Thereby, a porosity gradient through the layer can be provided. Such a gradient can be fine tuned by the multi-layer structure comprising more than the two mentioned layers. Other multilayer structures may, for example, comprise layers having different composition or conductivity.

More preferred is the anode layer and/or cathode layer being a multilayer structure.

Suitable materials for the formation of the anode support layer are compositions comprising NiO alone or mixed with $Al_2O_3$, $TiO_2$, $Cr_2O_3$, MgO or mixtures thereof and/or doped zirconia or doped ceria, and/or a metal oxide with an oxygen ion or proton conductivity. Suitable dopants are Sc, Y, Ce, Ga, Sm, Gd, Ca and/or any Ln element, or combinations thereof. Preferably, the anode support layer is formed from a composition comprising NiO and doped zirconia or doped ceria.

Suitable materials for the formation of the anode layer include compositions as for instance given for anode support layers above, further comprising a catalyst (e.g. Ni and/or Cu) or precursor thereof mixed with doped zirconia, doped ceria and/or a metal oxide with an oxygen ion or proton conductivity.

Preferred for the anode layer are materials selected from the group of Ni, Ni—Fe alloy, Cu, doped ceria, doped zirconia, or mixtures thereof. Alternatively $Ma_sTi_{1-x}Mb_xO_{3-\delta}$, Ma=Ba, Sr, Ca; Mb=V, Nb, Ta, Mo, W, Th, U; $0 \leq s \leq 0.5$; or $LnCr_{1-x}M_xO_{3-\delta}$, M=T, V, Mn, Nb, Mo, W, Th, U may be used as anode materials. X is preferably from about 0 to 1, more preferably from about 0.1 to 0.5, and most preferably from 0.2 to 0.3.

Preferred for the cathode layer and cathode precursor layer are materials selected from the group of LSM $(La_{1-x}Sr_x)MnO_{3-\delta}$, $(Ln_{1-x}Sr_x)MnO_{3-\delta}$, LSFC $(La_{1-x}Sr_x)Fe_{1-y}Co_yO_{3-\delta}$, $(Ln_{1-x}Sr_x)Fe_{1-y}Co_yO_{3-\delta}$, $(Y_{1-x}Ca_x)Fe_{1-y}Co_yO_{3-\delta}$, $(Gd_{1-x}Sr_x)Fe_{1-y}Co_yO_{3-\delta}$, $(Gd_{1-x}Ca_x)Fe_{1-y}Co_yO_{3-\delta}$, $(Y,Ca)Fe_{1-y}Co_yO_{3-\delta}$, doped ceria, doped zirconia, or mixtures thereof and/or a metal oxide with an oxygen ion or proton conductivity. Ln=lanthanides. In the above formulae, x is preferably from about 0 to 1, more preferably from about 0.1 to 0.5, and most preferably from 0.2 to 0.3. Y is preferably from about 0 to 1, more preferably from about 0.1 to 0.5, and most preferably from 0.2 to 0.3.

Suitable materials for the formation of the electrolyte layer include doped zirconia, doped ceria, gallates or proton conducting electrolytes ($SrCe(Yb)O_{3-\delta}$, $BaZr(Y)O_{3-\delta}$) or the like.

Suitable materials for the formation of the barrier layer include doped ceria. Preferably, the layer has a thickness of from about 0.1 to about 5 µm.

Additives may be added to each layer composition as needed, such as pore formers, sintering additives, solvents, surfactants, binders, release agents, and the like, as is well known to the skilled person. These additives assist for instance to obtain the desired porosity, density or to control the process ability of the layers/components.

Second Embodiment

In the second embodiment, the present invention provides a method of producing a reversible solid oxide cell, comprising the steps of:
tape casting an anode support layer on a support (1);
tape casting an electrolyte layer on a support (3); and either
tape casting an anode layer on top of said anode support layer;
laminating said electrolyte layer on top of said anode layer;
optionally removing support (1) and/or (3) from the anode support layer and/or the electrolyte layer; and
sintering the multilayer structure; or
tape casting an anode layer on top of said electrolyte layer;

laminating said anode support layer on top of said anode layer;

optionally removing support (1) and/or (3) from the anode support layer and/or the electrolyte layer; and sintering the multilayer structure.

As outlined above for the first embodiment, the obtained multilayer structure of the second embodiment may be used in SOC applications, such as a solid oxide fuel cell or solid oxide electrolysis cell, or as a separation membrane.

Preferably, the obtained multilayer structure is reversible. Reversible in the sense of the present invention relates to the common basic structure of the SOFC and SOEC. In an SOFC, fuel is fed into the cell and converted into power, while in an SOEC power is applied. The multilayer structure obtained with the process of the present invention may preferably be suitable to be used in both, SOFCs and SOECs, and is therefore a reversible multilayer structure.

Preferably, the steps of tape casting an anode support layer on a support (1) and tape casting an anode layer on top of the anode support layer is carried out by co-casting of the respective layers. It is further preferred to employ wet on wet tape casting. This ensures excellent bonding of the two layers on each other. Furthermore, a drying step may be omitted in wet on wet casting, thus making the process less time consuming and in return more cost efficient.

It is also preferred that the step of tape casting said anode layer on top of the electrolyte layer is carried out by co-casting of the respective layers. It is further preferred to employ wet on wet tape casting in this step. Furthermore, a drying step may be omitted in wet on wet casting, thus making the process more time and in return cost efficient.

Co-casting advantageously results in a large reduction in production costs. It is preferred to co-cast the layers directly onto a support, such as a steel belt. The co-casting may preferably include a cathode layer or cathode precursor layer. Thereby, an additional sintering step can be omitted.

The method preferably further comprises the steps of:

tape casting a cathode layer or cathode precursor layer on a support (4);

removing said support (3) from the electrolyte layer;

laminating said cathode layer or cathode precursor layer on top of said electrolyte layer; and optionally removing said support (4)

prior to sintering the multilayer structure.

Also preferred is the method further comprising the steps of:

removing said support (3) from the electrolyte layer; and tape casting a cathode layer or cathode precursor layer on top of said electrolyte layer prior to sintering the multilayer structure.

The cathode may not only be applied by lamination or direct tape casting on the electrolyte layer as outlined above, and which is preferred, but may also be applied by other methods, such as direct tape casting, spraying or screen printing.

Of course, a barrier layer may also be applied if desired. The barrier layer may be applied in the same way as the cathode, i.e. by lamination or direct tape casting, spraying or screen printing. The barrier layer advantageously prevents interface reactions between the electrolyte and cathode. Depending on the cathode composition, the barrier layer is an optional layer and may be employed if desired.

The preferred parts of the first embodiment, including additional method steps, additional layers, such as the barrier layer and cathode layer or cathode precursor layer, thicknesses, multilayer structures and materials for each layer, as outlined above together with the various advantages thereof, of course also apply to the method of the second embodiment.

Additional advantages of laminating the electrolyte layer on to a co-cast anode support-anode layer are that the benefits of co-casting for the anode support and anode layer are maintained, and further that an independent quality control of the electrolyte layer is possible prior to sintering. Defects in the electrolyte are very critical and must be avoided.

Third Embodiment

In the third embodiment, the present invention provides a method of producing a reversible solid oxide cell, comprising the steps of:

tape casting an anode support layer on a support (1);

tape casting an anode layer on top of the anode support layer;

tape casting an electrolyte layer on top of the anode layer; and sintering the multilayer structure; or tape casting an electrolyte layer on a support (1);

tape casting an anode layer on top of said electrolyte layer;

tape casting an anode support layer on top of said anode layer; and sintering the multilayer structure.

As outlined above for the first embodiment, the obtained multilayer structure may be used in SOC applications, such as a solid oxide fuel cell or solid oxide electrolysis cell, or may be used in separation membranes. Preferably, the obtained multilayer structure is reversible. Reversible in the sense of the present invention relates to the common basic structure of the SOFC and SOEC. In an SOFC, fuel is fed into the cell and converted into power, while in an SOEC power is applied. The multilayer structure obtained with the process of the present invention may preferably be suitable to be used in both, SOFCs and SOECs, and is therefore a reversible multilayer structure.

Preferably, the steps of tape casting an anode support layer on a support (1) and tape casting an anode layer on top of the anode support layer is carried out by co-casting of the respective layers. Also preferred is the layers being cast by wet on wet tape casting. This ensures excellent bonding of the two layers on each other. Furthermore, when wet on wet casting is employed, a drying step is omitted, thus making the process more time and in return cost efficient.

Further preferred is the steps of tape casting an electrolyte layer on a support (1) and tape casting an anode layer on top of said electrolyte layer being carried out by co-casting of the respective layers. Also preferred is the layers being cast by wet on wet tape casting. The anode support layer is afterwards applied.

Furthermore, preferred is the steps of tape casting the electrolyte layer on the anode layer being carried out by wet on wet tape casting. This again ensures excellent bonding of the two layers on each other. Furthermore, a drying step is omitted, thus making the process more time and in return cost efficient. The anode support layer is afterwards applied.

Co-casting advantageously results in a large reduction in production costs. It is preferred to co-cast the layers directly onto a support, such as a steel belt. By co-casting of a structure comprising anode-support, anode, electrolyte and a cathode (precursor layer) a cell may be manufactured with only one sintering step needed.

Preferably, the method of further comprises the step of:

tape casting a cathode layer or cathode precursor layer on top of the electrolyte layer prior to sintering the multilayer structure.

In case of a cathode precursor layer, the method also includes a step of impregnating the cathode precursor layer with a catalyst or catalyst precursor material.

The cathode may not only be applied by tape casting on the electrolyte layer as outlined above, which is preferred, but may also be applied by other methods, such as spraying or screen printing.

Of course, a barrier layer may also be applied if desired. The barrier layer may be applied in the same way as the cathode, i.e. by lamination or direct tape casting, spraying or screen printing. The barrier layer advantageously prevents interface reactions between the electrolyte and cathode. Depending on the cathode composition, the barrier layer is an optional layer and may be employed if desired.

More preferred is the method comprising the steps of:
tape-casting a cathode or cathode precursor layer on a support (4);
tape-casting a barrier layer on top of the cathode layer;
tape-casting an electrolyte layer on top of the barrier layer;
tape-casting an anode layer on top of the electrolyte layer;
tape-casting an anode support layer on top of the anode layer; and
sintering the multilayer structure.

Alternatively, the method preferably comprises the steps of:
tape-casting an anode support layer on a support (1);
tape-casting an anode layer on top of the anode support layer;
tape-casting an electrolyte layer on top of the anode layer;
tape-casting a barrier layer on top of the electrolyte layer;
tape-casting a cathode or cathode precursor layer on top of the barrier layer; and
sintering the multilayer structure.

The step of tape casting the anode layer directly on the anode support layer and tape casting the electrolyte layer directly on the anode layer still allows for a precise thickness control of each layer.

The preferred parts of the first embodiment, including additional method steps, additional layers, such as the barrier layer and cathode layer or cathode precursor layer, thicknesses, multilayer structures and materials, as outlined above together with the various advantages thereof, of course also apply to the method of the third embodiment.

With the methods of the present invention, advantageously a more efficient process is provided with which a multilayer structure is obtained in high accuracy while maintaining cost effectiveness. The amount of waste material is significantly reduced, less time and energy needed, and the obtained product is less liable to defects causing a breakdown during operation due to a significant reduction of impurities. Moreover, some materials may be reused, even further reducing the amount of waste.

Due to the tape casting steps, the methods for forming the respective layers are not limited with respect to the maximum size of the obtained layers. This allows to effectively mass produce the multilayer structures in order to meet the demand of the market without the need of multiple production sizes required for the same output if, for example, spray painting is used is one of the production steps.

The present invention moreover provides sintered multilayer structure, which is obtainable by the above methods. Advantageously, said multilayer structure exhibits less layer defects caused by impurities. Further, the obtained structure has a much improved homogeneity of the microstructure of each layer throughout. Moreover, the thickness of each layer can be very precisely and accurately controlled without thickness variations or waste of material.

Therefore, the obtained multilayer structure is more robust while each layer can be stacked on each other with good contact to each other. Consequently, the obtained multilayer structure is less prone to failure during operation, as compared to multilayer structures of the prior art, and the lifetime and reliability can be significantly increased.

The multilayer structure of the present invention is suitable to be used in applications including, for example, solid oxide fuel cells, solid oxide electrolysis cells and oxygen or proton separation membranes.

The invention will now be illustrated by means of the following examples. Alternative embodiments and examples exist without departing from the scope of the present invention. The so formed solid oxide fuel cells may also be operated in the reversed mode of solid oxide electrolysers.

EXAMPLES

Example 1

Manufacture of a Solid Oxide Fuel Cell

In the first step three layers were individually tape cast onto a polymeric support. Layer 1: an anode support layer, layer 2: an active anode layer and layer 3: an electrolyte layer. Suspensions for tape-casting were manufactured by means of ball milling of powders with polyvinyl pyrrolidone (PVP), menhaden fish oil, polyvinyl butyral (PVB) and EtOH+MEK as additives. After control of particle size, the suspensions were tape-cast using a double doctor blade system and the obtained layers were subsequently dried.

Layer 1: The suspension comprised Yttria stabilised zirconia (YSZ) and about 55 vol % NiO powder. The green thickness of the tape-cast layer was in the range of 400 μm. The porosity of this layer was in the range of 30% after sintering and reduction.

Layer 2: The suspension comprised Yttria stabilised zirconia (YSZ) and about 60 vol % NiO powder. As a pore former 20 vol % graphite was added. The green thickness of the tape-cast layer was about 25 μm. The porosity of this layer was about 25% after sintering and reduction.

Layer 3: The suspension comprised Yttria stabilised zirconia (YSZ) the green thickness of the tape-cast layer was about 15 μm.

In the second step the tapes were laminated AS-A-E by employing heated rolls in a double roll set-up, wherein the lamination took place in one pass. The temperature was about 140° C. and the pressure was about 1 bar.

In the fourth step, the laminated tapes were cut into the desired shapes. This was done by knife punching resulting in areas of 12×12 cm² after sintering. The support was removed from layers 1 and 3.

In the fifth step, the half-cell was sintered. The half-cell was placed in a furnace and sintered at about 1350° C. and left for about 12 hours before cooling to room temperature. FIG. 1 illustrates the obtained microstructure after sintering, comprising the electrolyte layer (layer 3) on top of the anode layer (layer 2) and the anode support layer (layer 1).

In the sixth step, a cathode was deposited on the sintered half-cell by spray painting with a suspension comprising a 1:1 weight ratio mixture of $La_{0.75}Sr_{0.25}MnO_{3-\delta}$ and YSZ on the surface of layer 3. The suspension was manufactured as described for the suspensions in step 1. The thickness of the sprayed layer was 30 μm before sintering.

The seventh step was the sintering of the cell in a furnace at about 1100° C. for 2 hours before cooling to room temperature.

Figure 2:
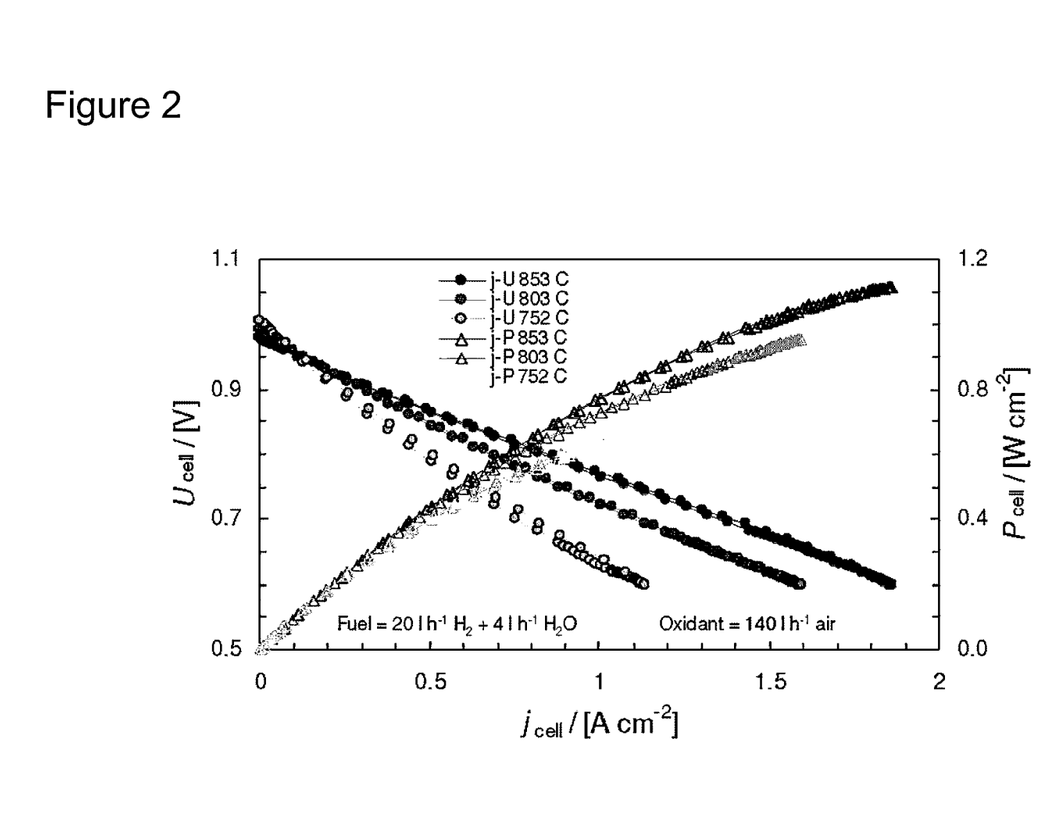
FIG. 2 shows the performance of a cell in terms of the voltage and power density as a function of current.

The electrical performance of the cell was measured as the voltage and power density as a function of the current density, as illustrated in FIG. 2. The measurements were carried out at 750° C., 800° C. and 850° C., respectively. The area specific resistance was found to be 0.32 Ωcm², 0.21 Ωcm² and 0.16 Ωcm², respectively.

Thus, a cell with an excellent electrical performance at temperatures of 750° C. to 850° C. was obtained.

Example 2

Manufacture of a Solid Oxide Fuel Cell

A solid oxide fuel cell was obtained as outlined in Example 1, with the exception that YSZ was substituted by SYSZ (Scandia and Yttria doped zirconia) in all layers except for the anode support layer.

Example 3

Manufacture of a Solid Oxide Fuel Cell

The first five steps of Example 1 were repeated.

In the sixth step, a cathode was deposited on the sintered half-cell by screen printing of an ink comprising a 1:1 weight ratio mixture of $La_{0.75}Sr_{0.25}MnO_{3-\delta}$ and YSZ on the surface of layer 3. The ink was manufactured as described for the suspensions in step 1. The thickness of the screen printed layer was 40 μm before sintering.

In the seventh step the cell was sintered in a furnace at about 1100° C. and left for 2 hours before cooling to room temperature.

Example 4

Manufacture of a Solid Oxide Fuel Cell

A solid oxide fuel cell was obtained as outlined in Example 3, with the exception that YSZ was substituted by SYSZ in all layers.

Example 5

Manufacture of a Thin Solid Oxide Fuel Cell

The manufacture was carried out as outlined in Example 1, but with layer 1 having a thickness of about 200 microns.

Example 6

Manufacture of a Thin Solid Oxide Fuel Cell

The manufacture was carried out as outlined in Example 1, but with layer 1 having a thickness of 300 microns and with 20% alumina substituted for YSZ.

After lamination the tapes were cut into 15×20 cm² before sintering at about 1300° C. The cell was completed as described in Example 1.

Example 7

Manufacture of a Solid Oxide Fuel Cell with Co-Sintering of the Cathode

The first step was the tape-casting of four layers. Layer 1: an anode support, layer 2: an anode, layer 3: an electrolyte and layer 4: a cathode on a support. The suspensions were manufactured as described for the suspensions in Example 1, step 1.

Layer 1: The suspension comprised Yttria stabilised zirconia (YSZ) and about 55 vol % NiO powder. The green thickness of the tape-cast layer was in the range of 300 μm. The porosity of this layer was in the range of 30% after sintering and reduction.

Layer 2: The suspension comprised Scandia Yttria stabilised zirconia (SYSZ) and about 60 vol % NiO powder. As a pore former 8 vol % PMMA was added. The green thickness of the tape-cast layer was about 25 μm. The porosity of this layer was about 30% after sintering and reduction.

Layer 3: The suspension comprised Scandia Yttria stabilised zirconia (SYSZ). 0.25 weight % alumina was added as sintering additive. The green thickness of the tape-cast layer was in the range of about 15 μm.

Layer 4: The suspension comprised $La_{0.75}Sr_{0.25}MnO_{3-\delta}$ and SYSZ in a 1:1 weight ratio. The green thickness of the tape-cast layer was in the range of 40 μm. The sintered porosity was 40%.

In the second step layer 1 was laminated on layer 2, followed by removing the support from layer 2. The lamination was performed by employing heated rolls in a double roll set-up and took place in one pass. The temperature was about 130° C. and the pressure was about 1 bar.

The third step was the lamination of layer 3 on layer 2 and removing the support from layer 3. The lamination was performed by employing heated rolls in a double roll set-up and took place in one pass. The temperature was about 150° C. and the pressure was about 1 bar.

The fourth step was the lamination of layer 4 on layer 3. The lamination was performed by employing heated rolls in a double roll set-up and took place in one pass. The temperature was about 170° C. and the pressure was about 1 bar.

In the fifth step, the laminated tapes were cut into squared pieces. This was done by knife punching resulting in areas of 18×18 cm² after sintering. The support was removed from layer 1 and 4.

In the sixth step, the cell was sintered at about 1150° C. and left for 12 hours before cooling to room temperature.

Example 8

Manufacture of a Solid Oxide Fuel Cell with Impregnation of the Cathode

The first step was the tape-casting of four layers. Layer 1: an anode support layer, layer 2: an anode layer, layer 3: an electrolyte layer, layer 4: a porous cathode precursor layer on a support. The suspensions were manufactured as described for the suspensions in Example 1, step 1.

Layer 1: The suspension comprised Yyttria stabilised zirconia (YSZ) and about 55 vol % NiO powder. The green thickness of the tape-cast layer was in the range of 300 μm. The porosity of this layer was in the range of 35% after sintering and reduction.

Layer 2: The suspension comprised Scandia Yttria stabilised zirconia (SYSZ) and about 60 vol % NiO powder. As a pore former 8 vol % PMMA was added. The green thickness of the tape-cast layer was about 25 μm. The porosity of this layer was about 25% after sintering and reduction.

Layer 3: The suspension comprised Scandia Yttria stabilised zirconia (SYSZ). 0.25 weight % alumina was added as sintering additive. The green thickness of the tape-cast layer was about 12 μm.

Layer 4: The suspension comprised Scandia Yttria stabilised zirconia (SYSZ). The green thickness of the tape-cast layer was in the range of about 25 μm. The sintered porosity was about 50%.

In the second step layer 1 was laminated on layer 2, followed by removing the support from layer 2. The lamination was performed by employing heated rolls in a double roll set-up and took place in one pass. The temperature was about 130° C. and the pressure was about 1 bar.

The third step was the lamination of layer 3 on layer 2 and removing the support from layer 3. The lamination was performed employing heated rolls in a double roll set-up and took place in one pass. The temperature was about 150° C. and the pressure was about 1 bar.

The fourth step comprised the lamination of layer 4 on layer 3. The lamination was performed by employing heated rolls in a double roll set-up and took place in one pass. The temperature was about 170° C. and the pressure was 1 bar.

In the fifth step, the laminated tapes were cut into squared pieces. This was done by knife punching resulting in areas of 18×18 cm$^2$ after sintering. The support was removed from layer 1 and 4.

In the sixth step, the cell was sintered at about 1200° C. and left for 12 hours before cooling to room temperature.

FIG. 3 illustrates the obtained microstructure after sintering, comprising a cathode precursor layer on top of the electrolyte layer (layer 3), the anode layer (layer 2) and the anode support layer (layer 1).

In the seventh step an active cathode was vacuum impregnated into the porous cathode precursor layer. The suspension comprised $La_{0.75}Sr_{0.25}MnO_{3-\delta}$ and SYSZ in a 3:1 vol ratio.

Example 9

Manufacture of a Solid Oxide Fuel Cell with Impregnation of Cathode

The first to sixth step of the manufacture were carried out as explained in Example 8.

In the seventh step the cathode was made by vacuum impregnation of a solution made from La, Sr, and Mn nitrates dissolved in water. The impregnation was done six times with intermediate drying at 450° C. to decompose the nitrates. The so formed cathode did not require any sintering prior to operation.

Example 10

Manufacture of a Solid Oxide Fuel Cell with Doped Ceria and Impregnation of Cathode The solid oxide fuel cell was manufactured as outlined in Example 8, wherein zirconia was substituted with doped ceria in all layers.

Example 11

Manufacture of a Solid Oxide Fuel Cell with a Spin Coated Barrier Layer

The first to fifth step of the manufacture of the half cell were carried out as described in Example 1.

The sixth step was spin coating of a precursor solution of CGO barrier layer on the surface of layer three at the sintered half cell. The suspension was manufactured by dissolving $Ce(NO_3)_3$ and $Gd(NO_3)_3$ in water and ethylene glycol at pH<3 for several days at 80° C.

The seventh step was a heat treatment at about 450° C. for 1 hour.

In the eighth step, a cathode was deposited on the barrier layer by spray painting with a suspension comprising a 1:1 weight mixture of $(La_{0.6}Sr_{0.4})(Co_{0.2}FeO_{0.8})O_{3-\delta}$ and CGO (Gadolinium doped ceria) on the surface of layer 3. The suspension was manufactured as described for the suspensions in step 1. The thickness of the sprayed layer was 30 μm before sintering.

The ninth step was sintering of the cell in a furnace at about 1000° C. for 2 hours before cooling to room temperature.

Example 12

Manufacture of a Solid Oxide Fuel Cell with Co-Sintering of the Barrier Layer

The first step was the tape-casting of four layers. Layer 1: an anode support, layer 2: an anode, layer 3: an electrolyte and layer 4: a barrier layer on a support. The suspensions are manufactured as described for the suspensions in Example 1, step 1.

Layer 1: The suspension comprised Yttria stabilised zirconia (YSZ) and about 55 vol % NiO powder. The green thickness of the tape-cast layer is about 200 μm. The porosity of this layer is about 32% after sintering and reduction.

Layer 2: The suspension comprised Scandia Yttria stabilised zirconia (SYSZ) and about 65 vol % NiO powder. The green thickness of the tape-cast layer is about 35 μm. The porosity of this layer is about 25% after sintering and reduction.

Layer 3: The suspension comprised Scandia Yttria stabilised zirconia (SYSZ) with 0.25% alumina added as sintering additive. The green thickness of the tape-cast layer about 12 μm.

Layer 4: The suspension comprised CGO (Gadolinium doped ceria). The green thickness of the tape-cast layer is about 5 μm.

The second step was the lamination of layer 1 on layer 2 and removing the support from layer 2. The lamination was performed employing heated rolls in a double roll set-up and takes place in one pass. The temperature was 100° C. and the pressure was 1 bar.

In the third step layer 3 was laminated on layer 2, followed by removing the support from layer 3. The lamination was performed employing heated rolls in a double roll set-up and took place in one pass. The temperature was 120° C. and the pressure was 1 bar.

The fourth step was the lamination of layer 4 on layer 3. The lamination was performed by employing heated rolls in a double roll set-up and took place in one pass. The temperature was 85° C. and the pressure was 1.5 bar.

In the fifth step, the laminated tapes were cut into square pieces. This was done by knife punching resulting in areas of 12×12 cm$^2$ after sintering. The support was removed from layers 1 and 4.

In the sixth step, the cell was sintered at about 1150° C. and left for 12 hours before cooling to room temperature.

In the seventh step, the half-cell was spray painted with a $(La_{0.7}Sr_{0.3})Co_{0.2}Fe_{0.8}O_{3-\delta}$ and CGO cathode on the surface of the barrier layer. The suspension was manufactured as described for the suspensions in step 1. The thickness of the sprayed layer was 30 μm.

The eighth step was sintering of the cell in a furnace at about 950° C. and left for 2 hours before cooling to room temperature.

Example 13

Manufacture of a Solid Oxide Fuel Cell by Co-Casting

Wet on Dry Multilayer Tape-Casting

The first step was tape-casting of layer one: an anode support on a paper film. Casting thickness was 400 µm. The suspension was manufactured as described for the suspensions in Example 1, step 1. The tape-cast layer was allowed to dry.

The second step was tape-casting of layer two: an anode directly on the surface of layer 1. Casting thickness was 25 µm. The suspension was manufactured as described for the suspensions in Example 1, step 1. The layer was allowed to dry.

The third step was tape-casting of layer 3: an electrolyte directly on the surface of layer 2. Casting thickness is 15 µm. The suspension was manufactured as described for the suspensions in Example 1, step 1. The tape-cast layer was allowed to dry.

In the fourth step, the so formed multilayer tapes were cut into square pieces. This was done by knife punching resulting in areas of 25×25 cm² after sintering.

In the fifth step, the half-cell was sintered. The half-cell was placed in a furnace and sintered at about 1300° C. and left for about 12 hours before cooling to room temperature.

In the sixth step, a cathode was deposited on the sintered half-cell by spray painting with a suspension comprising a 1:1 weight ratio mixture of $La_{0.75}Sr_{0.25}MnO_{3-\delta}$ and YSZ on the surface of layer 3. The suspension was manufactured as described for the suspensions in step 1. The thickness of the sprayed layer was 30 µm before sintering.

The seventh step was sintering of the cell in a furnace at about 1100° C. for 2 hours before cooling to room temperature.

Example 14

Manufacture of a Solid Oxide Fuel Cell with Co-Casting Wet on Wet of Electrolyte, Active Anode and Anode Support Layer In the first step three layers were tape-cast directly on the top of each other on a support without intermediate drying. Layer 1: an electrolyte, layer 2: an anode and layer 3 an anode support. The suspensions were manufactured as described for the suspensions in Example 1, step 1.

Layer 1: The suspension comprised Scandia Yttria stabilised zirconia (SYSZ). The green thickness of the tape-cast layer was in the range of 10 µm.

Layer 2: The suspension comprised Scandia Yttria stabilised zirconia (SYSZ) and about 60 vol % NiO powder. The green thickness of the tape-cast layer was about 20 µm. The porosity of this layer was about 25% after sintering and reduction.

Layer 3: The suspension comprised Yttria stabilised zirconia (YSZ) and about 60 vol % NiO powder. The green thickness of the tape-cast layer was in the range of 200 µm. The porosity of this layer was in the range of 30% after sintering and reduction.

In the second step, the multilayer tapes were cut into square pieces. This was done by knife punching resulting in areas of 25×25 cm² after sintering. The support was removed from layer 1.

In the third step, the cell was sintered in a furnace at about 1300° C. for about 10 hours before cooling to room temperature.

The cell was completed as described in Example 1.

Example 15

Manufacture of a Solid Oxide Fuel Cell with Co-Casting Wet on Wet of Electrolyte, Active Anode and Anode Support Layer Directly on to a Steel Belt The first step was tape-casting of three layers directly on the top of each other on a metal belt without intermediate drying. Layer 1: an electrolyte, layer 2: an anode and layer 3 an anode support. The suspensions were manufactured as described for the suspensions in Example 1, step 1.

Layer 1: The suspension comprised Scandia Yttria stabilised zirconia (SYSZ). The green thickness of the tape-cast layer was about 15 µm.

Layer 2: The suspension comprised Scandia Yttria stabilised zirconia (SYSZ) and about 60 vol % NiO powder and 2 vol % $TiO_2$. The green thickness of the tape-cast layer was about 25 µm. The porosity of this layer was about 30% after sintering and reduction.

Layer 3: The suspension comprised Yttria stabilised zirconia (YSZ) and about 55 vol % NiO powder and 3 vol % $Cr_2O_3$. The green thickness of the tape-cast layer was in the range of 200 µm. The porosity of this layer was in the range of 30% after sintering and reduction.

In the fifth step, the multilayer tapes were removed from the steel belt and cut into square pieces. This was done by knife punching resulting in areas of 15×15 cm² after sintering.

In the sixth step, the cell was sintered in a furnace at 1250° C. for about 12 hours before cooling to room temperature.

The cell was completed as described in Example 1.

Example 16

Manufacture of a Solid Oxide Fuel Cell with Co-Casting Wet on Wet of Electrolyte, Active Anode and Anode Support Layer Directly on to a Steel Belt The manufacture was carried out as outlined in Example 12, but completed as described in steps 6 and 7 in Example 2.

Example 17

Manufacture of a Solid Oxide Fuel Cell with Co-Casting Wet on Wet of Cathode, Electrolyte, Active Anode and Anode Support Layer The first step was the tape-casting of 4 layers directly on the top of each other on a support without intermediate drying. Layer 1: a cathode, Layer 2 an electrolyte, layer 3: an anode and layer 4 an anode support: The suspensions were manufactured as described for the suspensions in Example 1, step 1.

Layer 1: The suspension comprised a 1:1 weight % mixture of $La_{0.75}Sr_{0.25}MnO_{3-\delta}$ and Scandia Yttria stabilised zirconia (SYSZ) The green thickness of the tape-cast layer was in the range of 40 µm. The sintered porosity was 40%.

Layer 2: The suspension comprised Scandia Yttria stabilised zirconia (SYSZ). The green thickness of the tape-cast layer was in the range of 10-15 µm.

Layer 3: The suspension comprised Scandia Yttria stabilised zirconia (SYSZ) and about 60 vol % NiO powder. The green thickness of the tape-cast layer was about 30 μm. The porosity of this layer was about 20% after sintering and reduction.

Layer 4: The suspension comprised Scandia Yttria stabilised zirconia (SYSZ) and about 55 vol % NiO powder. The green thickness of the tape-cast layer was in the range of 100 μm. The porosity of this layer was in the range of 25% after sintering and reduction.

In the fifth step, the multilayer tapes were cut into square pieces. This was done by knife punching resulting in areas of 25×25 cm² after sintering. The support was removed from layer 1.

In the sixth step, the cell was sintered in a furnace at 1100° C. for about 12 hours before cooling to room temperature.

Example 18

Manufacture of a Solid Oxide Fuel Cell with Co-Casting Wet on Wet of Cathode Precursor, Electrolyte, Active Anode and Anode Support Layer A solid oxide fuel cell was manufactured as outlined in Example 17, wherein a cathode precursor layer was applied to the sintered structure and afterwards impregnated with a catalyst material.

Example 19

Manufacture of a Solid Oxide Fuel Cell with Co-Casting Wet on Wet of Cathode, Barrier Layer, Electrolyte, Active Anode and Anode Support Layer The first step was tape-casting of all layers directly on the top of each other on a support without intermediate drying. Layer 1: a cathode, Layer 2: a CGO barrier, Layer 3 an electrolyte, layer 4: an anode and layer 5 an anode support: The suspensions were manufactured as described for the suspensions in Example 1, step 1.

Layer 1: The suspension comprised a 1:1 weight % mixture of $La_{0.6}Sr_{0.4}Co_{0.2}Fe_{0.8}O_{3-\delta}$ and CGO (Gadolinium doped ceria). The green thickness of the tape-cast layer was in the range of 30 μm. The sintered porosity was 40%.

Layer 2: The suspension comprised Gd doped ceria (CGO). The green thickness of the layer was around 3 μm.

Layer 3: The suspension comprised Scandia Yttria stabilised zirconia (SYSZ). 0.25 weight % Al2O3 was added as a sintering additive. The green thickness of the tape-cast layer was in the range of 10-15 μm.

Layer 4: The suspension comprised Scandia Yttria stabilised zirconia (SYSZ) and about 60 vol % NiO powder. The green thickness of the tape-cast layer was about 30 μm. The porosity of this layer was about 25% after sintering and reduction.

Layer 5: The suspension comprised Scandia Yttria stabilised zirconia (SYSZ) and about 55 vol % NiO powder. The green thickness of the tape-cast layer was in the range of 100 μm. The porosity of this layer was in the range of 30% after sintering and reduction.

In the fifth step, the multilayer tapes were cut into square pieces. This was done by knife punching resulting in areas of 25×25 cm² after sintering. The support was removed from layer 1.

In the sixth step, the cell was sintered in a furnace at 1100° C. for about 12 hours before cooling to room temperature.

Example 20

Manufacture of a Solid Oxide Fuel Cell with Co-Casting and Lamination

The first step was tape-casting of layer 1: an anode support on paper. The suspensions were manufactured as described for the suspensions in Example 1, step 1.

The suspension comprised Yttria stabilised zirconia (YSZ) and about 55 vol % NiO powder. The green thickness was about 250 μm. The sintered reduced porosity was around 32%.

The second step was tape-casting of layer 2: an electrolyte on a paper film. The suspension was manufactured as described for the suspensions in Example 1, step 1. The suspension comprised Scandia Yttria stabilised zirconia (SYSZ). The green thickness was around 12 μm.

In the third step an anode (layer 3) was tape-cast onto layer 2 without intermediate drying. The suspension comprised Yttria stabilised zirconia (YSZ) and about 60 vol % NiO. The green thickness of the cast layer was about 30 μm.

The fourth step was the lamination of layer 1 on layer 3 side of the co-cast layer 2 and 3. The lamination was performed by employing heated rolls in a double roll set-up and took place in one pass. The temperature was 170° C. and the pressure was about 2 bar.

In the fifth step, the laminated tapes were cut into square pieces. This was done by knife punching resulting in areas of about 20×20 cm² after sintering.

The sixth step was carried out as steps 5 to 7 in Example 1.

The invention claimed is:
1. A method of producing a reversible solid oxide cell, comprising the steps of:
   tape casting an anode support layer on a first support;
   tape casting an anode layer on a second support;
   tape casting an electrolyte layer on a third support; and either
   laminating said anode layer on top of said anode support layer;
   removing said second support from said anode layer;
   laminating said electrolyte layer on top of said anode layer; and
   sintering the multilayer structure; or
   laminating said anode layer on top of said electrolyte layer;
   removing said second support from said anode layer;
   laminating said anode support layer on top of said anode layer; and
   sintering the multilayer structure,
   wherein at least one lamination step is carried out under a pressure of 1 to 2 bar and a temperature between 20° C. and 250° C.

2. The method of claim 1, further comprising the removal of said first support, and/or said third support from said anode support and/or electrolyte layer prior to sintering.

3. The method of claim 1, further comprising the steps of:
   tape casting a cathode layer or cathode precursor layer on a fourth support;
   removing said third support from the electrolyte layer; and
   laminating said cathode layer on top of said electrolyte layer.

4. The method of claim 1, further comprising the steps of:
   tape casting a barrier layer on a fifth support;
   tape casting a cathode layer or a cathode precursor layer on a fourth support;

removing said third support from the electrolyte layer;
laminating said barrier layer on top of said electrolyte layer;
removing said fifth support from said barrier layer; and
laminating said cathode layer or cathode precursor on top of said barrier layer.

5. The method of claim 1, wherein the sintering is carried out at temperatures of from about 900° C. to about 1500° C.

6. The method of claim 3, further comprising the step of impregnating the cathode precursor layer with a catalyst or catalyst precursor material.

7. The method of claim 1, wherein the lamination steps are carried out without the use of additional solvent.

8. A method of producing a reversible solid oxide cell, comprising the steps of:
tape casting an anode support layer on a first support;
tape casting an electrolyte layer on a third support; and either
tape casting an anode layer on top of said anode support layer;
laminating said electrolyte layer on top of said anode layer; and
sintering the multilayer structure; or
tape casting an anode layer on top of said electrolyte layer;
laminating said anode support layer on top of said anode layer; and
sintering the multilayer structure,
wherein at least one lamination step is carried out under a pressure of 1 to 2 bar and a temperature between 20° C. and 250° C., and
wherein the step of tape casting an anode layer on top of said anode support layer or tape casting an anode layer on top of said electrolyte layer is carried out by wet on wet casting.

9. The method of claim 8, further comprising the steps of:
tape casting a cathode layer or cathode precursor layer on a fourth support;
removing said third support from the electrolyte layer; and
laminating said cathode layer or cathode precursor layer on top of said electrolyte layer.

10. The method of claim 8, further comprising the steps of:
removing said third support from the electrolyte layer; and
tape casting a cathode layer or cathode precursor layer on top of said electrolyte layer prior to sintering the multilayer structure.

11. A method of producing a reversible solid oxide cell, comprising the steps of:
tape casting an anode support layer on a first support;
tape casting an anode layer on top of the anode support layer;
tape casting an electrolyte layer on top of said anode layer; and
sintering the multilayer structure; or
tape casting an electrolyte layer on a first support;
tape casting an anode layer on top of said electrolyte layer;
tape casting an anode support layer on top of said anode layer; and
sintering the multilayer structure,
wherein at least one lamination step is carried out under a pressure of 1 to 2 bar and a temperature between 20° C. and 250° C., and
wherein the step of tape casting an electrolyte layer on top of said anode layer is carried out by wet on wet casting.

12. The method of claim 8, further comprising the step of:
tape casting a cathode layer or cathode precursor layer on top of the electrolyte layer prior to sintering the multilayer structure.

13. The method of claim 9, further comprising the step of impregnating the cathode precursor layer with a catalyst or catalyst precursor material.

14. The method of claim 11, wherein the step of tape casting said anode support layer on top of said anode layer is carried out by wet on wet casting.

15. The method of claim 3, further comprising removing said fourth support prior to sintering the multilayer structure.

* * * * *